United States Patent [19]
Wirsig

[11] 3,970,325
[45] July 20, 1976

[54] INFANT CREEPER
[75] Inventor: Ralph Wirsig, Kingston, Canada
[73] Assignee: Lawrence Peska Associates, Inc., New York, N.Y. ; a part interest
[22] Filed: May 15, 1975
[21] Appl. No.: 577,663

[52] U.S. Cl. .............................. 280/87.02 W; 297/5; 297/377; D12/130
[51] Int. Cl.² ............................................ B62B 7/04
[58] Field of Search ............ 280/87.02 W, 87.02 R, 280/79.2, 47.38, 31, 36 B; 297/5, 6, 349, 377; D12/128, 129, 130

[56] References Cited
UNITED STATES PATENTS

| | | |
|---|---|---|
| 3,009,733 | 11/1961 | Gelman ................................. 297/5 |
| 3,183,028 | 5/1965 | Williams ..................... 280/87.02 W |
| 3,290,050 | 12/1966 | Ezquerra ................................. 297/5 |
| 3,797,849 | 3/1974 | Sherman ..................... 280/47.38 X |
| D224,220 | 7/1972 | Boultbee ........................... D12/129 |

Primary Examiner—M. H. Wood, Jr.
Assistant Examiner—John A. Pekar

[57] ABSTRACT

The apparatus includes a baby seat having a generally planar first portion with an elongated generally planar back portion for supporting the entire spinal column of the infant with which it will be used. The seat may be selectively positioned on a chassis which is provided with casters or used independently.

4 Claims, 2 Drawing Figures

INFANT CREEPER

BACKGROUND OF THE INVENTION

The invention relates to seating apparatus for an infant and particularly to an apparatus which allows the infant to propel himself such as that typically referred to as "creepers".

The prior art includes a number of devices such as that shown in Petry, et al, U.S. Pat. No. 3,463,504 which has a seat having a general similarity to the present invention. The apparatus therein is provided with wheels and a handle intended for allowing a person to wheel the child. Other United States Patents having a general relevance to the subject matter of this invention include Hurd, U.S. Pat. No. 75,274; Burnham, U.S. Pat. No. 3,145,999; MacLaren, U.S. Pat. No. 3,390,893; and Boudrequ, et al, U.S. Pat. No. 3,550,998. The apparatus shown in these patents is in general intended solely for creeping or solely for allowing another individual to wheel the infant. Additionally, the apparatus shown in the Hurd, U.S. Pat. No. 75,274 lacks adequate support for the child's spinal column to facilitate the apparatus' usefulness for young infants who have not yet developed the capability to sit without support.

Accordingly it is an object of the invention to provide an apparatus which may readily be converted from a portable seating apparatus to a creeper apparatus which will enable the infant to propel himself (herself) and to develop improved muscle control and strength.

Still another object of the invention is to provide an apparatus which is simple and inexpensive to manufacture.

Yet another object of the invention is to provide an apparatus which will occupy a minimum amount of space.

A still further object of the invention is to provide a creeper apparatus which provides substantially full support for the spinal column of young infants not yet old enough to have developed the capability to sit without support.

SUMMARY OF THE INVENTION

It has now been found that these and other objects of the invention may be satisfied by a baby creeper adapted to move on a support surface comprising a contoured body including a first generally rearwardly inclined planar surface having disposed at a point generally at right angles thereto an elongated back support for support of the entire spinal column of a baby, the point of right angle formation being disposed at a minimum height such that there is substantially no contact with the support surface, a lip depending from the first generally planar surface; a chassis for elevation and support of the creeper and having a plurality of caster wheels disposed thereabout, the chassis including an elongated generally rectilinear bar on one side thereof, means for carrying the seat on the chassis, the means including the lip resting on the bar, the point of right angle formation being at least as low to the support surface as chassis, the first surface being disposed at a relative height above the support surface such that the baby's feet communicate with the support surface.

In one form of the invention the means further include at least two bars extending from the back support to said chassis to more fully support the seat. A plurality of attachment points may be provided for at least one end of each of the bars engaging said back support to allow adjustability therebetween and accordingly vary the angle.

BRIEF DESCRIPTION OF THE DRAWING

The invention will be better understood by reference to the accompanying drawing in which.

DESCRIPTION OF THE PREFERRED EMBODIMENT

Figure 1:
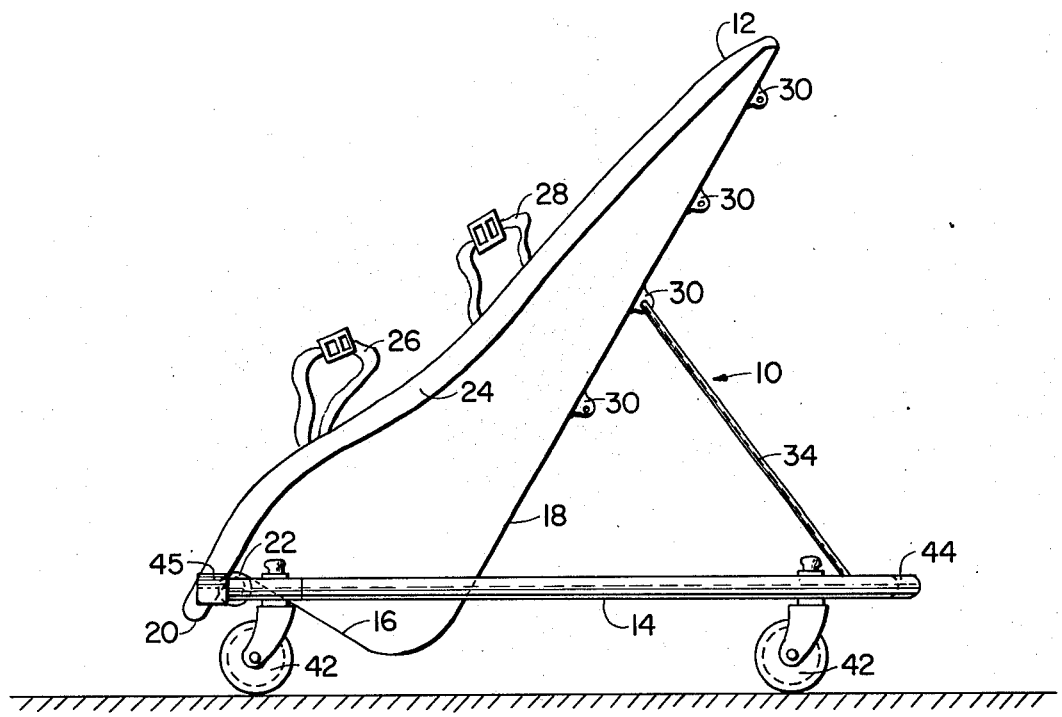
FIG. 1 is a side elevational view of the apparatus in accordance with the invention.
Figure 2:
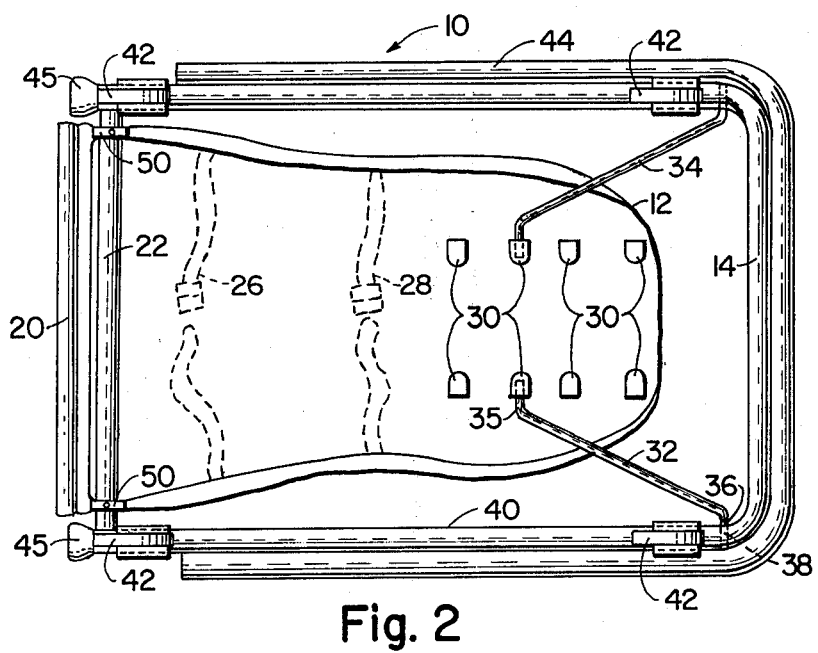
FIG. 2 is a bottom view of the apparatus shown in FIG. 1.

Referring now to FIGS. 1 and 2 there is shown a creeper 10, defining a contoured body 12 which includes a back support and seat and a chassis 14. The body 12 includes a first generally planar portion 16, i.e., a seat and disposed generally at right angles thereto an elongated generally planar back portion 18. The back portion 18 must be long enough to provide support to the entire spinal column of the child. Depending from the first generally planar portion is a lip 20 which engages a bar 22 which is part of the chassis 14. It will be understood that bar 22 as used herein comprehends both solid bars as well as hollow tubing. The side of the body 12 may have a flange 24 or side enveloping portions curved away from the interior portion of the body 12 to avoid rough edges being presented to the infant who is carried therein. Straps 26, 28 are provided to securely hold the child within the body 12 and particularly to avoid the prospect that the child will lean forward sufficiently to tip the creeper 10. A plurality of loops 30 are disposed on the rear of the elongated back support 18 for engagement with bars 32, 34 at a plurality of intervals and particularly for bearing the angle with respect to the chassis 14. Normally the bars 32, 34 will have end portions 35, 36 disposed in parallel relationship for selective engagement with the members 30 and a hole 38 carried within the chassis 14.

The chassis 14 may include a generally U-shaped member 40 which at the open ends thereof is fixedly secured to the arm 22. Disposed at at least four locations, i.e., each corner, to insure stability of the creeper 10 are casters or wheels 42. A resilient bumper 44 extends circumferencially around the U-shaped member 40 and additional bumpers 45 are disposed at the ends of generally U-shaped member 40.

It will be seen that the invention relates to an infant's wheeled vehicle that is particularly designed for the use by an infant who requires substantial support to his spinal column but who has, through the use of this vehicle, the capability to propel himself along a relatively level surface by the use of his or her legs. The apparatus so provided gives substantial support to the child's spinal column which is particularly important when the child is young and also permits the child to learn and develop muscle coordination as well as to explore new areas while strengthening his muscles. Adjustable collars 50, 50 may be provided to provide lateral support with respect to the chassis 14. The adjustability of the relative positioning and orientation of the body 12 with respect to the chassis having wheels 42 and also the surface on which the creeper 10 rests are of importance to the success of the apparatus in accordance with the invention. In operation the infant is placed in the body 12 in a semi-reclining position. The angle of recline is adjustable by locating the bars 32, 34 in various members 30. The infant is strapped securely with the straps 26, 28. It has been found that the resilient bumpers 40, 45 allow the infant to negotiate more readily around obstacles since an impact produces an equal and opposite force which tends to urge the creeper 10 away from the obstacle involved.

It will be understood that the body 12 in accordance with the invention will normally be made from a plastic and injection molded. The chassis 14, on the other hand may be manufactured of metal and the resilient bumper 40, 45 of rubber or suitable plastic tubing.

It will be apparent that the body 12 may be used independently of the chassis 14.

Having thus described my invention, I claim:

1. A baby creeper adapted to move on a support surface comprising a contoured body including a first generally rearwardly inclined planar surface having disposed at a point generally at right angles thereto an elongated back support for support of the spinal column of a baby, said point of right angle formation being disposed at a minimum height such that there is substantially no contact with the support surface, a lip depending from said first generally planar surface; a chassis for elevation and support of said creeper and having a plurality of wheels disposed thereabout, said chassis including an elongated generally rectilinear bar on one side thereof, means for carrying said seat on said chassis, said means including said lip resting on said bar, said means further including at least two bars engaging said back support and said chassis to support said body and a plurality of discrete attachment points for selectively engaging said bars to vary the angle between said chassis and said body, said point of right angle formation being at least as low to said support surface as the chassis, said first surface being disposed at a relative height above said support surface such that the baby's feet communicate with said support surface.

2. The apparatus as described in claim 1 further including a resilient bumper disposed around substantially all of said chassis.

3. The apparatus as described in claim 1 wherein the lower portion of said planar surface is disposed at a level substantially corresponding to the height of said wheels.

4. The apparatus as defined in claim 1 wherein said wheels are caster wheels.

* * * * *